United States Patent [19]
Carter et al.

[11] Patent Number: 5,551,387
[45] Date of Patent: Sep. 3, 1996

[54] TUNED INTAKE MANIFOLD FOR OTTO CYCLE ENGINES

[75] Inventors: Stephen A. Carter, Mississauga; Karl-Heinz Kozole, Burlington; Richard T. Hannaby, Mississauga, all of Canada

[73] Assignee: Ortech Corporation, Ontario, Canada

[21] Appl. No.: 393,682

[22] Filed: Feb. 24, 1995

[51] Int. Cl.$^6$ .................................................. F02M 35/10
[52] U.S. Cl. ........................... 123/184.42; 123/184.47; 123/184.53
[58] Field of Search ................ 123/184.42, 184.47, 123/184.53

[56] References Cited

U.S. PATENT DOCUMENTS

| | | | |
|---|---|---|---|
| 3,845,746 | 11/1974 | Elsbett | 123/184.42 |
| 4,501,235 | 2/1985 | Muller | 123/184.42 |
| 4,760,819 | 8/1988 | Vorum | 123/184.42 |
| 4,867,110 | 9/1989 | Distelrath | 123/184.42 |
| 5,379,735 | 1/1995 | Ma | 123/184.42 |

FOREIGN PATENT DOCUMENTS

| | | | |
|---|---|---|---|
| 2311636 | 11/1974 | Germany | 123/184.47 |
| 450084 | 7/1949 | Italy | 123/184.47 |
| 60-222523 | 11/1985 | Japan | 123/184.42 |
| 2252791 | 8/1992 | United Kingdom | 123/184.47 |

*Primary Examiner*—David A. Okonsky
*Attorney, Agent, or Firm*—Shoemaker and Mattare, Ltd

[57] ABSTRACT

A tuned intake manifold is provided for OTTO cycle engines and includes a plenum having an aperture through which a gaseous fuel mixture can be received. First and second branch openings are disposed at opposite points across the plenum, with respective first and second branch conduits connected thereto. Each branch conduit divides into a plurality of runner conduits all terminating at a head flange. The various gaseous paths, each defined by one of the branch conduits and one of the runner conduits, have substantially the same length, substantially the same volume, and substantially the same radius and arc-length of curvature.

12 Claims, 9 Drawing Sheets

INVENTION MANIFOLD

TRI-Y MANIFOLD

4-LEG MANIFOLD

TRI-Y MANIFOLD

4-LEG MANIFOLD

INVENTION MANIFOLD

TUNED INTAKE MANIFOLD FOR OTTO CYCLE ENGINES

This invention relates to tuned intake manifolds for OTTO cycle engines, and has to do particularly within an improvement to such manifolds in order to provide better distribution of fuel with improved flow and flow stability, and more effective tuning.

BACKGROUND OF THIS INVENTION

The overwhelming majority of vehicles use Otto-cycle (throttled, spark-ignited) engines. Such engines may be fueled by gasoline, natural gas, liquefied petroleum gas (LPG), alcohol, or propane. In the U.S. over 175 Million vehicles use Otto cycle engines.

Otto-cycle engines control engine air consumption with a throttle. Air flows past the throttle, through the intake manifold, and on to the cylinder head. The manifold has four primary purposes, as noted below:
1. to maximize flow into the engine
2. to equally distribute up to five fluids to each cylinder intake air idle by-pass air fuel Positive Crankcase Ventilation (PCV) gases Exhaust Gas Recirculation (EGR) gases
3. to provide adequate air/fuel mixing
4. to add enough heat to vaporize the fuel.

While OTTO-cycle engines have been developed and improved over many years, there remains room for improvement, particularly in connection with the distribution of fuel to the cylinders and with the improvement of fuel-flow contour.

GENERAL DESCRIPTION OF THIS INVENTION

The present invention uses a markedly different concept to route fluids from the manifold's central plenum into the individual runner conduits. The new method groups the manifold runer conduits into pairs that mirror the engine's breathing sequence (e.g. 1–4 and 3–2 in the case of four cycle, in-line engines). A particular design of the plenum has the result that airflow into the individual runner conduits is alternately drawn from opposite sides of the plenum. This flow phasing may be referred to as symmetrical and synchronous. The symmetrical hardware geometry utilized has several inherent characteristics which favour the four primary purposes of the manifold, these characteristics being:

good distribution stable flow effective tuning equal heating of all runners.

The present concept is particularly beneficial in 4 and 6 cylinder engines which have independent intake ports and which use throttle body fuel introduction (TBI). However, it is also applicable to engines with siamese intake ports, to engines with any number of cylinders, to vee-type engines, horizontally opposed engines, and to engines using multipoint fuel injection (MPI). In order to simplify this discussion, a 4-cylinder engine with independent intake ports and throttle body fuel injection will be used as the comparison model.

By comparison, conventional intake manifold designs group the runners into pairs that mimic the engine's physical layout (e.g. 1–2 and 3–4). As a result, the airflow into the individual runners is drawn twice from each side of the plenum before alternating to the opposite side. The conventional design is thus prone to lower airflow, greater turbulence, lower flow stability and poorer distribution. The resulting asymmetrical geometry also tends to cause unequal heating of the individual manifold runners.

Intake manifolds often perform peripheral, mechanical functions which are not relevant to engine performance. Such peripherals include: bracing or mounting of accessories (alternator, etc.); mounting of throttle linkage mechanisms; sourcing of manifold vacuum to various servos (brake booster, etc.). These mechanical functions are not influenced by this design and need not be discussed further.

More particularly, this invention provides a tuned intake manifold for Otto cycle engines, comprising:

a plenum, an aperture in the plenum through which the plenum can receive a gaseous fuel mixture, first and second branch openings into the plenum, the openings being disposed in substantial opposition to each other across the plenum, first and second branch conduits communicating with said first and second branch openings respectively, each branch conduit divaricating into a plurality of runner conduits all of which terminate at their connections to a head flange; the various gaseous paths, each defined by one of the branch conduits and one of the runner conduits into which the branch conduit divaricates, being substantially free of abrupt angulations; and all said paths having substantially the same length beginning at the plenum, substantially the same volume, and substantially the same radius and arc-length of curvature.

Further, this invention provides a method for delivering a gaseous fuel mixture to the cylinders of an engine, having at least four in-line cylinders, the number of cylinders being even, comprising:

receiving the mixture in a plenum through an aperture, passing the mixture out of the plenum through first and second branch openings disposed in substantial opposition to each other across the plenum, passing the mixture into first and second branch conduits communicating with said first and second branch openings respectively, each branch conduit divaricating into a plurality of runner conduits all of which terminate at their connections to the engine; and ensuring that the various gaseous paths, each defined by one of the branch conduits and one of the runner conduits into which the branch conduit divaricates, all have substantially the same length beginning at the plenum, substantially the same volume, and substantially the same radius and arc-length of curvature.

GENERAL DESCRIPTION OF THE DRAWINGS

One embodiment of this invention is illustrated in the accompanying drawings, in which like numerals denote like parts throughout the several views and in which.

DETAILED DESCRIPTION OF THE DRAWINGS

Figure 1:
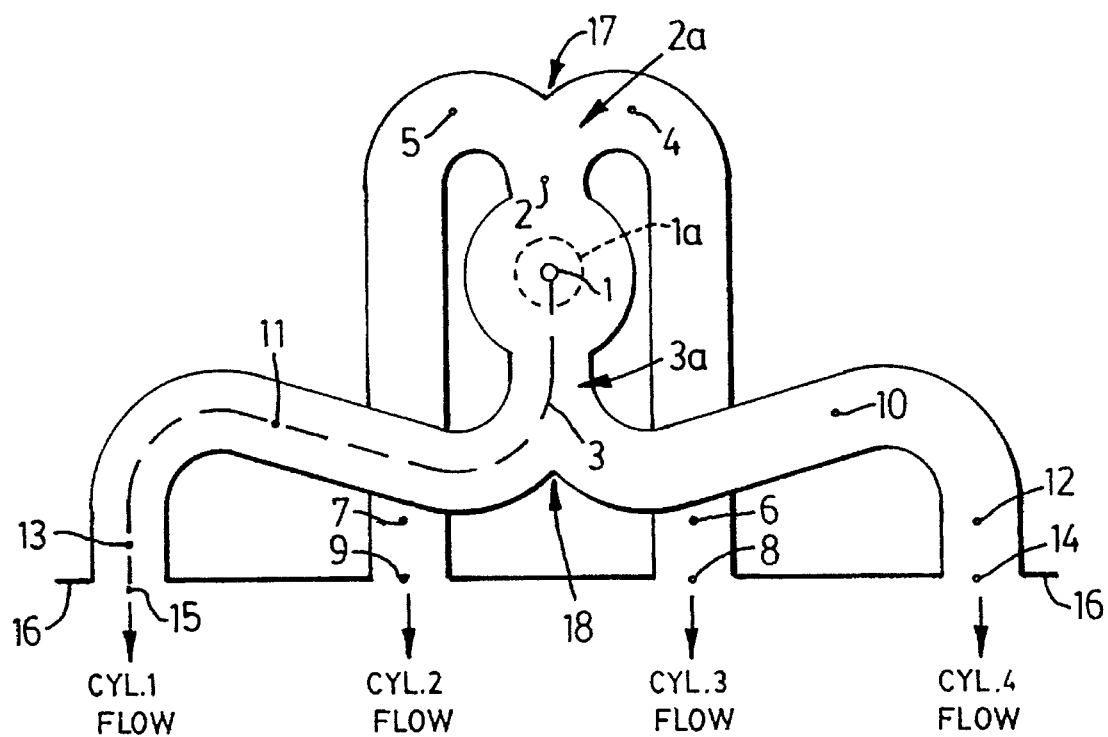
FIG. 1 is a schematic top view of the intake manifold of this invention.

Attention is directed to FIG. 1, in which the following components and parts are identified by number. A central cylindrical plenum 1 has an aperture 1a, typically an axial aperture, through which the plenum can receive a gaseous fuel mixture from a fuel throttling device. The aperture 1a is shown in broken line FIG. 1. Also shown are first and second branch openings 2 and 3 which are disposed in substantial opposition to each other across a diameter of the cylindrical plenum 1. First and second branch conduits 2a and 3a communicate with the first and second branch openings 2 and 3 respectively. As can be especially seen in FIG. 1, each branch conduit 2a, 3a divaricates into two runner conduits 4, 5 and 10, 11, respectively, and all of the runner conduits terminate at their connections to a head flange 16. The locations of divarication (bifurcation in this case) are marked by numerals 17 and 18 in FIG. 1. Other components illustrated in FIG. 1 are set forth in the table below, in order to avoid needless repetition.

Figure 4:
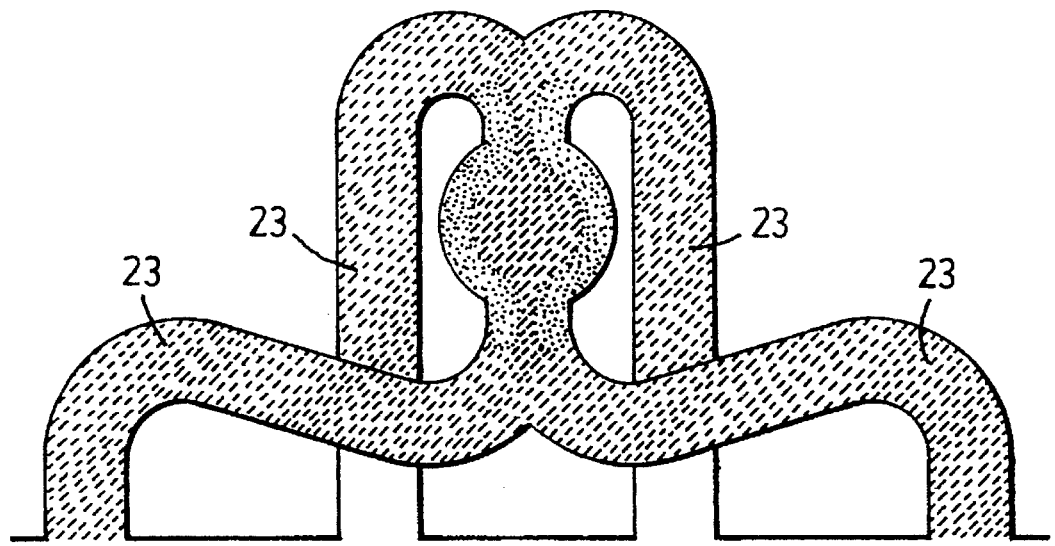

| Manifold Feature | FIG. 4 Reference Points | | | |
|---|---|---|---|---|
| | Cyl 1 | Cyl 4 | Cyl 3 | Cyl 2 |
| Plenum | | | 1 | |
| Branch opening | | 3 | | 2 |
| Runner conduit cross-section area | 11 | 10 | 4 | 5 |
| Transition section area | 13 | 12 | 6 | 7 |
| Port cross-section area | 15 | 14 | 8 | 9 |
| Cylinder head flange | | | 16 | |

Using the airflow into cylinder 1 as an example, air would flow through the plenum 1, to the branch conduit 3a, then on to the runner conduit 11, which connects to transition section area 13, the latter assuming the port cross-section area at 15, and then terminating at the head flange 16.

As already mentioned, the plenum 1 is preferably cylindrical and coaxial with the throttle bore. The plenum volume and height are consistent with conventional practice and are expected to promote good mixing while minimizing the pressure drop caused by turning the airflow 90° as it enters the branch conduits 2a and 3a. A review of three high volume manifolds reveals plenum volumes ranging from 9.8% to 27.5% of the engine swept volume. The test manifold used herein represented 9.8% of the engine swept volume, and was quite successful.

The plenum 1 is the preferred location to ensure fuel vaporization. Conventional practice is also applicable here. That is, a depression in the floor of the plenum (or a raised circumferential lip at the plenum's exit points) would capture any liquid fuel and retain it until it vaporized. The depth of the depression (or height of a lip) would be based on conventional practice. The heat of vaporization could come from a number of optional sources including: a coolant jacket surrounding the plenum (used in our test piece); an electric heater installed in the floor of the manifold; exhaust directed against the floor of the manifold (an approach no longer used in North American engines); or, exhaust gas recirculation (EGR) into the plenum area.

Figure 5:
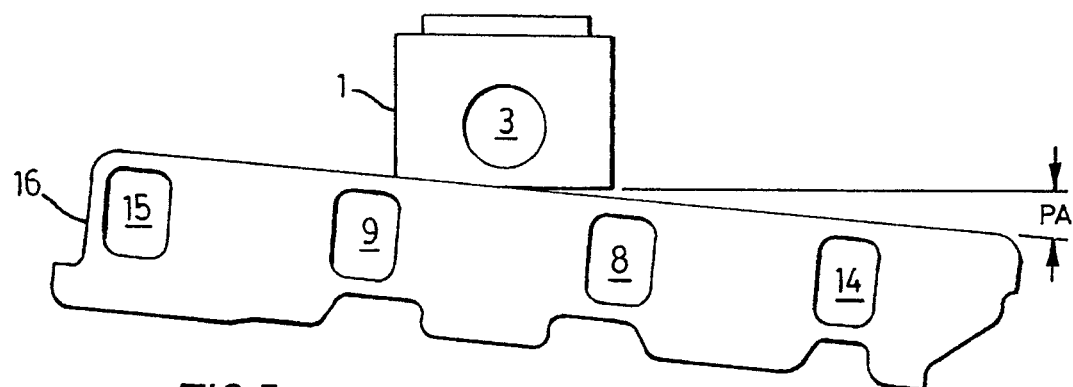
FIG. 5 is a schematic drawing, in elevation, showing the different vertical positions of components.

The preferred embodiment has the plenum floor horizontal and parallel to the throttle body flange (FIG. 5).

Almost all engines have an "as installed" power angle ($P\angle$), which is the angle between the horizontal center line of the crankshaft and true horizontal. Many engines also have a tilt angle ($T\angle$), which is the angle between the vertical center line of the engine and true vertical. Both $P\angle$ and $T\angle$ are commonly in the range of 5° to 15°. The preferred embodiment would accommodate the engine's angularity ($P\angle$ and $T\angle$) by adjusting the arc of the runners. That approach was used in our test part. FIG. 5 is a 2-D partial projection illustrating a horizontal plenum floor to be connected by the runner conduits (not shown) to the cylinder head flange which has a 15° $P\angle$. Notably, the runners all slope downhill from the plenum to the cylinder head flange.

Air from the plenum 1 alternately flows into branch conduits 2a and 3a. In the preferred embodiment, the branch conduits are cylindrical, although rectangular or other cross-sections can be used. In the preferred embodiment, both branch conduits 2a and 3a are equally sized (shape, length, and volume), equally spaced from the centre line of the plenum (throttle), and equally angled from the floor of the plenum. Again in the preferred embodiment, both branch conduits are either level or tilt downwards toward the cylinder head.

The cross-sectional area of the branches is chosen to maximize airflow and is based on conventional practice.

As shown in FIG. 1, runner conduits 1 and 5 intersect at juncture 17, which is the end of the branch conduit 2a. Similarly, the runner conduits 10 and 11 intersect at juncture 18, which is the end of the branch conduit 3a. In the preferred embodiment, the runner intersection points 17 and 18 lie within the same vertical plane as the vertical axis of the cylindrical plenum 1.

As can be seen in FIG. 1, the lengths and volumes of all four runner conduits 4, 5, 10 and 11 are preferably substantially identical. Also, the curvilinear portions of the runner conduits represent generally the same arc-length of curvature, and have substantially the same radius. In the preferred embodiment, all runner conduits are level and slope "downhill" from the branch junctures 17 and 18 to the manifold flange 16. As noted above, the engine's $P\angle$ and $T\angle$ are accommodated by adjusting the runner conduit geometries. That accommodation can be accomplished, while maintaining equal runner lengths and volumes, by any or all of the following means: adjusting bend radii and locations; moving the location of the plenum (for-aft and side—side); adjusting the angle between the center line of the runner conduits (at 8, 9, 14, 15) and the vertical plane of the flange 16 (eg., the angle might be 95° instead of the conventional 90° if the T∠=−5°).

As indicated, this invention is intended to be a tuned design. The general appearance, as shown in FIG. 1, illustrates the physical geometry needed to achieve typical tuning speeds. That is, it is necessary to bring the plenum relatively close to the cylinder head in order to get the total volumes and lengths small enough to put the first tuning frequency in the 4000–5000 rpm range on a 4-cylinder engine. The prototype manifold designed for a high volume 2.5 L 4-cylinder engine had a first tuning speed of 4000 rpm. Once equation to calculate the tuning speed is as follows:

$$N\pm = (30 \cdot a/2\pi) \cdot \{[(A \cdot B + A + 1) \pm (A \cdot B + A + 1)^2 - 4A \cdot B]/[2 \cdot A \cdot B \cdot L1 \cdot C1]\}0.5$$

Where:
$N\pm$ = tuned engine speeds
$A = (l_2 \cdot A_1)/(l_1 \cdot A_2)$
  $A_1$ = cross sectional area of runnner
  $l_1$ = distance from intake valve to plenum
  $A_2$ = cross sectional area of plenum
  $l_2$ = distance from plenum to throttle body inlet
$B = C_2/C_1$
  $C_1$ = Veff = $D \cdot (CR + 1)/[2 \cdot (CR - 1)]$
  $D$ = displacement per cylinder
  $CR_1$ = compression ratio
  $C_2$ = volume from throttle body inlet to intake valve $(l_1 \cdot A_1)$
$a$ = speed of sound in air (mixture)
$L_1 = l_1 \cdot A_1$
  assumes runners are of approximately equal length and volume adapted from Heywood, 1988, p.312–313.

Figure 2:
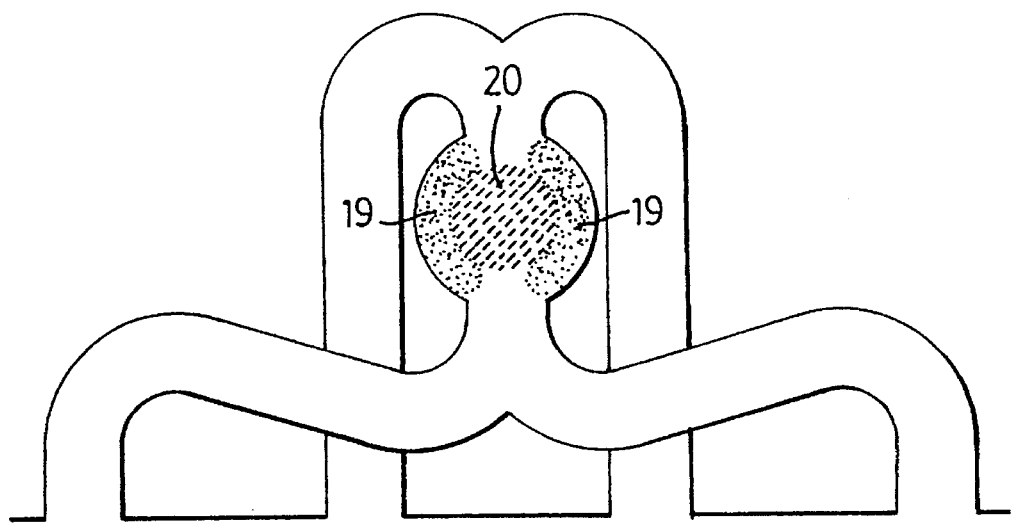
FIGS. 2, 3 and 4 are schematic drawings illustrating different possibilities for adding heat to the plenum and optionally to the runner conduits carrying fuel mixture to the cylinders.
Figure 3:
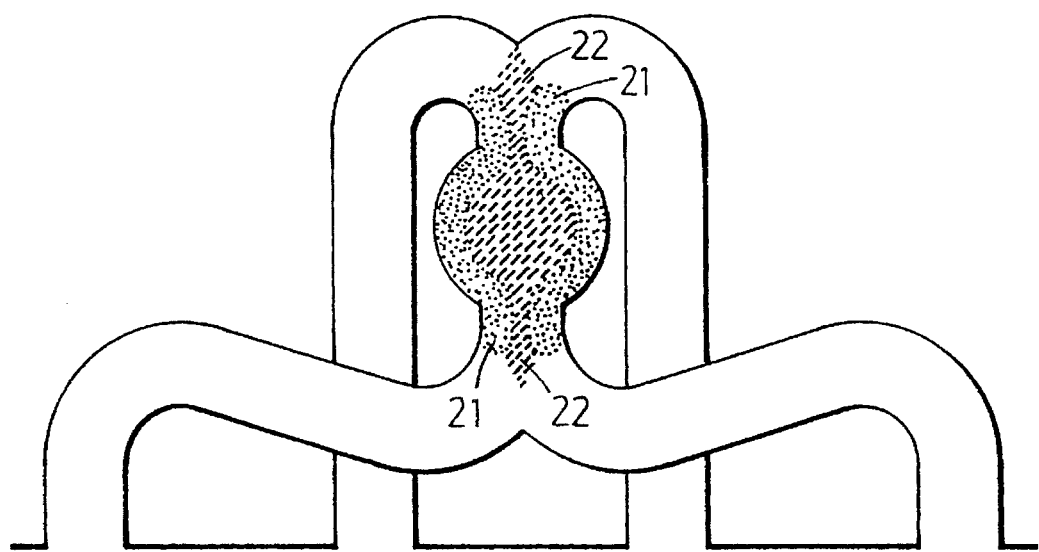
Figure 6:
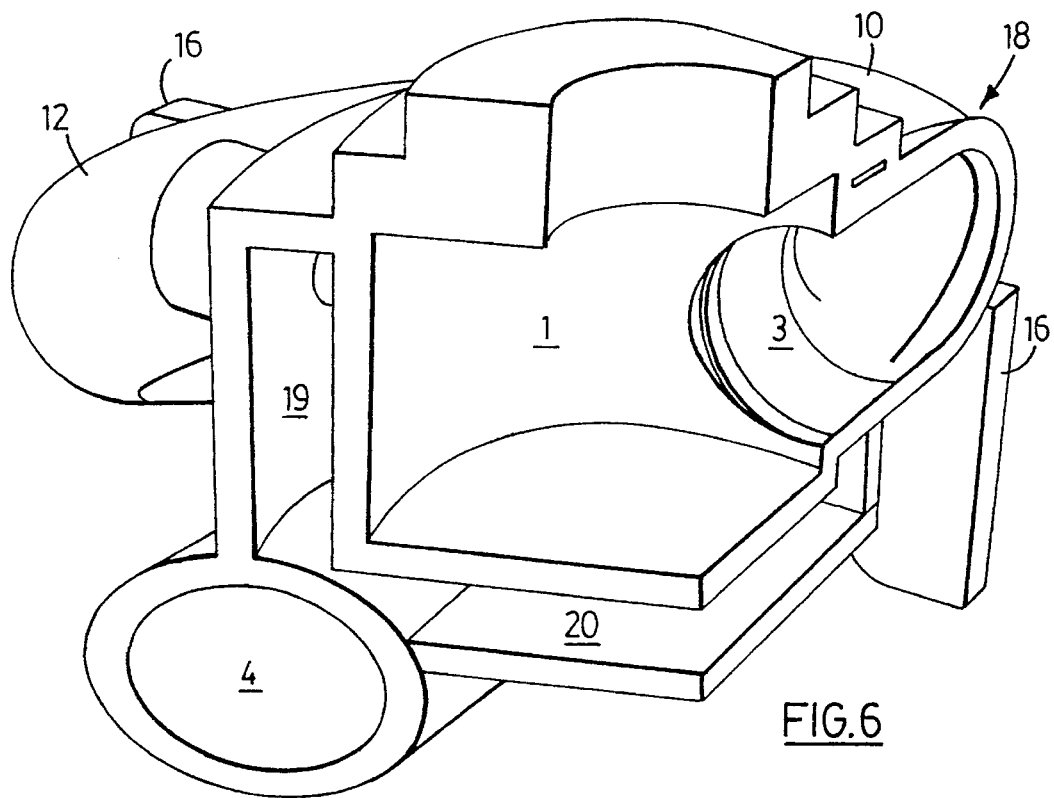
FIG. 6 is a partly broken-away, perspective view of an intake manifold constructed in accordance with this invention, and provided with jacket-heating means in order to ensure that liquid fuel will be vaporized.

In the lowest cost embodiment, manifold heating is provided by an engine coolant jacket. Notably, only enough heat should be added to vaporize any residual liquid fuel. Any heat above that amount merely increases the intake charge temperature, reducing its peak power output. Accordingly, the trend is to minimize manifold heating. FIGS. 2, 3 and 4 depict three options for the coolant jacket approach to heating the plenum. FIG. 1 shows a minimum approach wherein the coolant jacket surrounds the vertical portion of the plenum (19) and also underlies the floor of the plenum (20). FIG. 2 shows an option wherein the jacket is extended to also include the floor (22) and vertical wall portions (21) of the branches. FIG. 3 shows an extreme case where the coolant jacket also extends beneath the floor portion (23) of the runners for their entire length. FIG. 6 provides a 3-D cross sectional view of the plenum heating concept from FIG. 2.

As an alternative to coolant heating, electric heating is possible. Both Texas Instruments and GTE Sylvania have produced PTC (positive temperature coefficient) heaters for automotive use. Such heaters typically consist of an electrically heated aluminum body which is mounted in the floor of the manifold casting and is at least partially thermally isolated from the casting by gasketing or other insulator means. Such devices have had in-rush power levels >700 watts and quiescent power levels >700 watts. PTC heaters, although more expensive, can have some temperatures of 175° C., and thus are excellent alternatives for assuring fuel vaporization.

Figure 7:
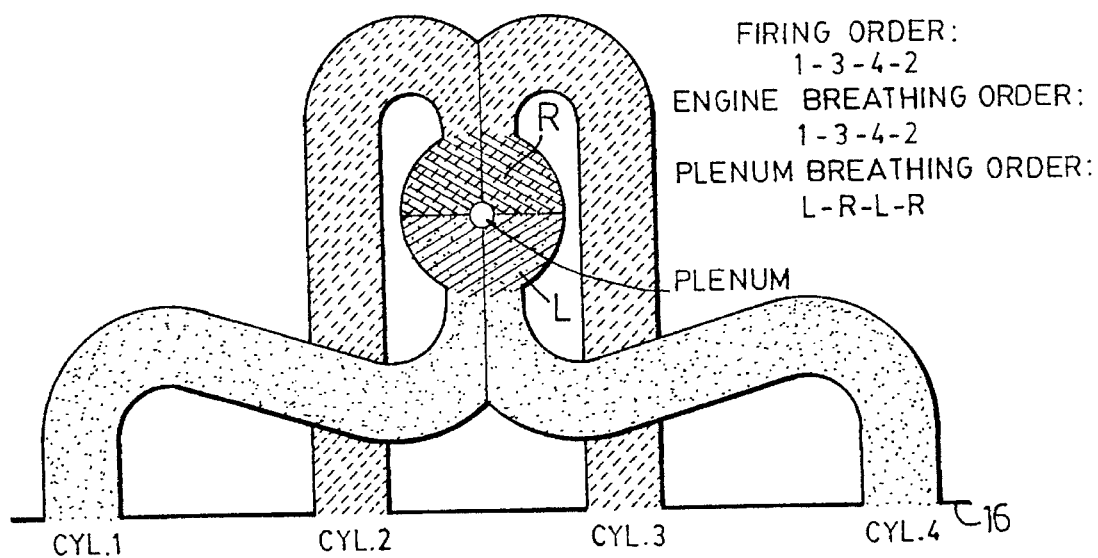
FIG. 7 is a schematic top plan view to an intake manifold in accordance with this invention, illustrating the engine breathing order.

A fundamental feature of this invention is the staging of airflow out of the plenum and into the runner conduits. Consider that the plenum has a left (L) and right (R) half as shown in FIG. 7. Also note that most 4-cylinder engines have a firing order, and hence a breathing sequence, of 1-3-4-2. Thus air will flow out of the plenum in the following sequence: L-R-L-R. Hence, the flow symmetrically switches back and forth between the two sides of the plenum, at the same frequency as the intake pulses occur. For purposes of illustrating the concept, the firing order 1-3-4-2 is used in the following examples. However, the concept also applies to the less frequently used firing order 1-2-4-3.

Figure 8:
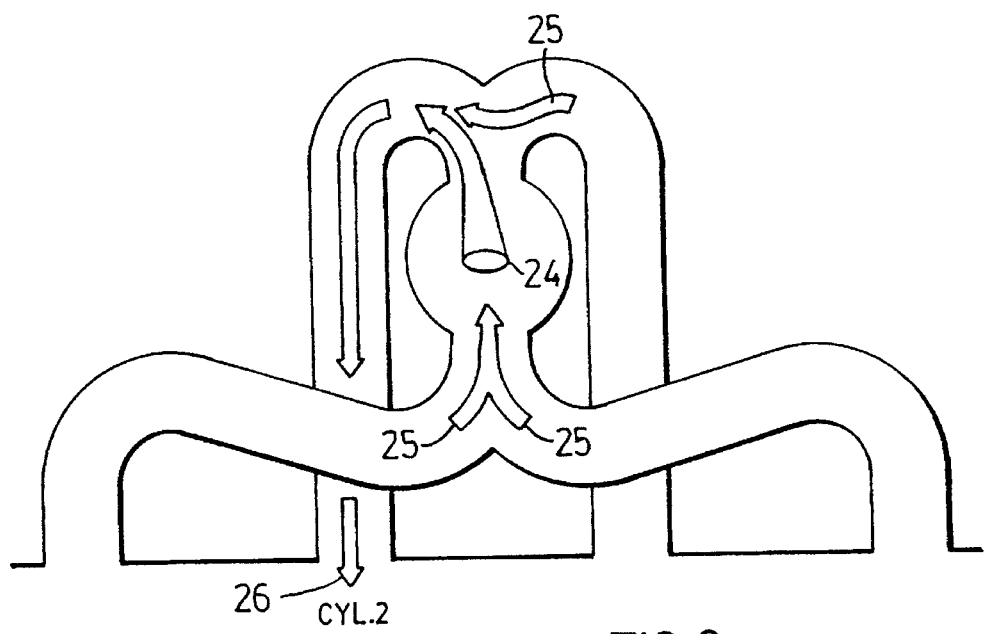
FIG. 8 is a further schematic view in top plan, showing the gaseous flow within the plenum when fuel is being directed to a particular cylinder.
Figure 9A:
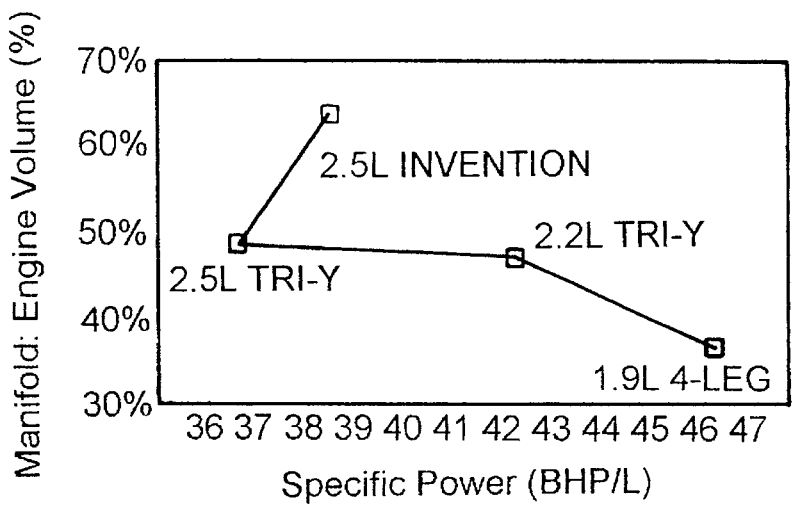
FIGS. 9a to 9e are graphs illustrating the superiority of the present intake manifold, in terms of specific power.
Figure 9B:
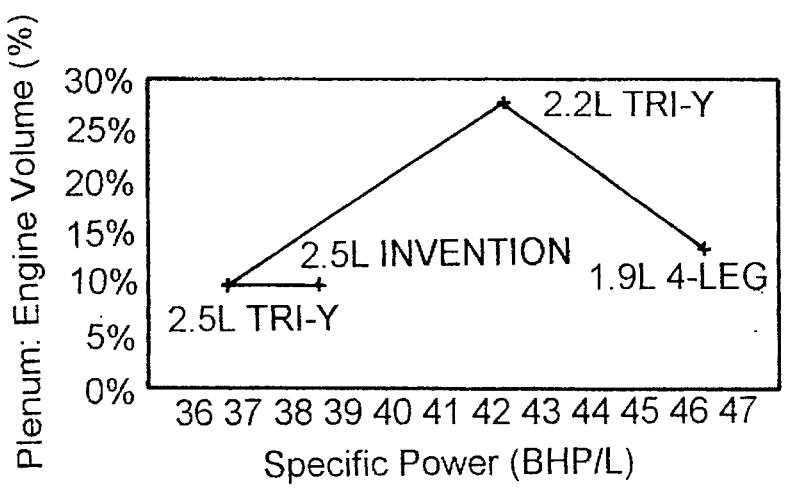
Figure 9C:
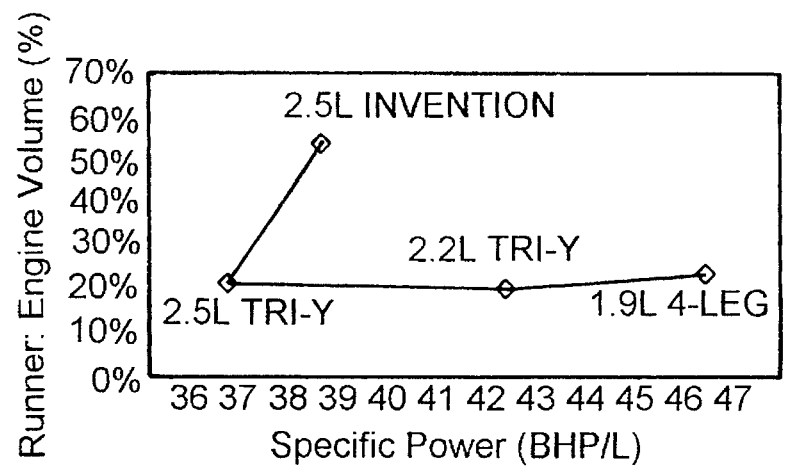
Figure 9D:
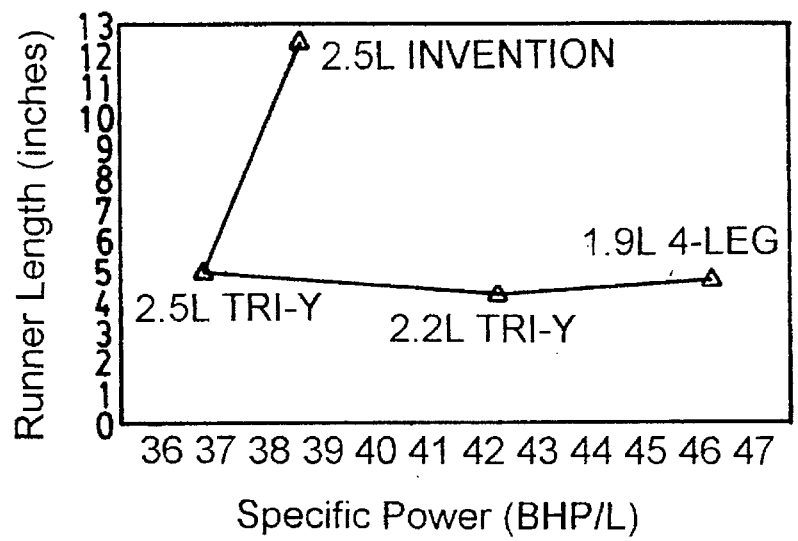
Figure 9E:
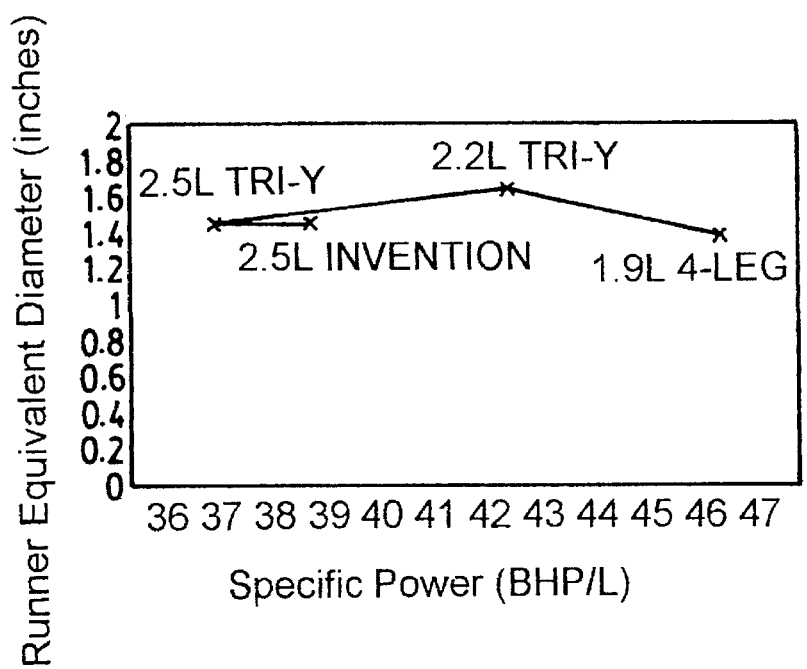

It is also worthwhile to note the sources of peak, instantaneous intake flow. FIG. 8 graphically depicts the sources of peak airflow, showing the condition where Cylinder 2 is breathing and the other three cylinders have closed intake valves. Peak flow (26) is composed of the main airflow (24) coming past the throttle, plus stored air (25) that is released from the dead-headed runner conduits (i.e. runner conduits connected to cylinders with closed intake valves). Two points are notable. Firstly, the vectors of the various flow components all tend to be in the direction of enhancing airflow into the active runner conduit, and creating only modest turbulence. Secondly, since the manifold is symmetrical, identical vector condition exists regardless of which cylinder is breathing (i.e. while vectors are mirror images, their amplitudes and relative relationships are unchanged). Thus, this concept is particularly stable and prone to equal distribution.

TEST RESULTS

An intake manifold in accordance with this invention has been designed, cast, and tested on a production 2.5 L 4-cylinder TBI engine. Air-fuel distribution was measured at 54 speed-load points and wide open throttle power measured at 17 points (200 to 5200 rpm), with two air cleaner configurations. The manifold in accordance with this invention provided more power, at all speeds, than the original equipment manifold. The data from those tests, along with the design features of the present invention, are compared to conventional manifold designs features of the present invention, are compared to conventional manifold designs in the discussion below.

Specifically, the intake manifold of this invention is compared to two conventional manifold design styles as used on three production engines. The two conventional design styles are referred to as TRI-Y manifolds (two reviewed) and 4-LEG manifolds (one reviewed). The table below compares manifold features. It is notable that all used throttle body fuel injection and were offered on recent, high volume North American 4-cylinder engines.

|  | Production Engine & Manifold Details | | | |
|---|---|---|---|---|
| ITEM | INVENT* | TRI-Y | 4-LEG | TRI-Y |
| Manufacturer |  | General Motors | Ford | Chrysler |
| Part No. |  | 10124608 | RF-E7EE-9425-JC | 4621360 |
| Engine size(cc's) | 2500[1] | 2500[1] | 1900 | 2200 |
| Power (@rpm) | ~+5% | 92 @ 4400 | 88 @ 4400 | 93 @ 5200 |
| Specific Power (BHP/L) |  | 36.8 | 46.3 | 42.3 |
| Plenum: Vol (cc's) | 246 | 246 | 254 | 604 |
| Plenum:Eng. Vol | 9.8% | 9.8% | 13.4% | 27.5% |
| Manifold Vol (cc's) | 1594 | 1220 | 700 | 1040 |
| Manifold:Eng. Vol | 63.8% | 48.8% | 36.8% | 47.3% |
| Runner Conduits |  |  |  |  |
| Lengths:        1 | 12.5 | 5.0 | 6.13 | 4.0 |
| (in inches)   2 | 12.5 | 5.0 | 3.38 | 4.5 |
|                      3 | 12.5 | 5.0 | 3.38 | 4.5 |
|                      4 | 12.5 | 5.0 | 6.13 | 4.0 |
| Runner Conduit Equivalent Dia. (in) | 1.445 | 1.445 | 1.37 | 1.641 |
| Runner Vol. (cc's) | 1348 | 522 | 446 | 436 |

Note[1]: same 2500 cc engine

As can be seen, the size of the runner conduits, plenums and overall manifolds varied significantly, in both absolute terms and as percentage of engine swept volume (36.8% to 48.8%). Specific power output also varied widely (36.8 to 46.3 BHP/L). However, as can be seen from the curves shown in FIGS. 10a through 10e, there is no obvious correlation between intake manifold design factors and specific power output. The exception is that use of the present design produced higher specific power output. The characteristics plotted in FIG. 10 are as follows:

| FIG. | Feature Plotted versus BHP/L |
|---|---|
| FIG. 9 | Manifold Volume ÷ Engine Volume |
| FIG. 9 | Plenum Volume ÷ Engine Volume |
| FIG. 9 | Runner Volume ÷ Engine Volume |
| FIG. 9 | Runner Conduit Length |
| FIG. 9 | Equivalent Runner Diameter |

Although the data sample is admittedly quite limited, the curves in FIG. 9 indicate that conventional manifold design features have no obvious, strong correlation with specific power output. In fact, one would expect specific power output to show a strong correlation with other factors such as camshaft lift, camshaft event duration, camshaft overlap, peak power rpm, intake valve size, number of intake valves, and compression ratio. Notably, while the present manifold's design feature did not seem to fit any possible trends from these three engines, it did produce more power. The obvious suggestion is that the present design approach is fundamentally different.

Figure 10A:
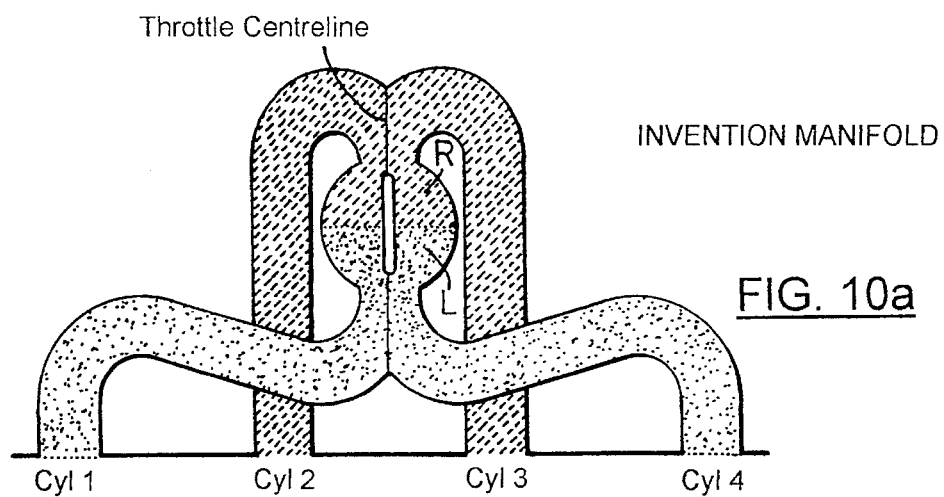
FIGS. 10a, 10b and 10c illustrate the breathing differences between the different manifold types, FIGS. 11b and 11c representing the prior art.
Figure 10B:
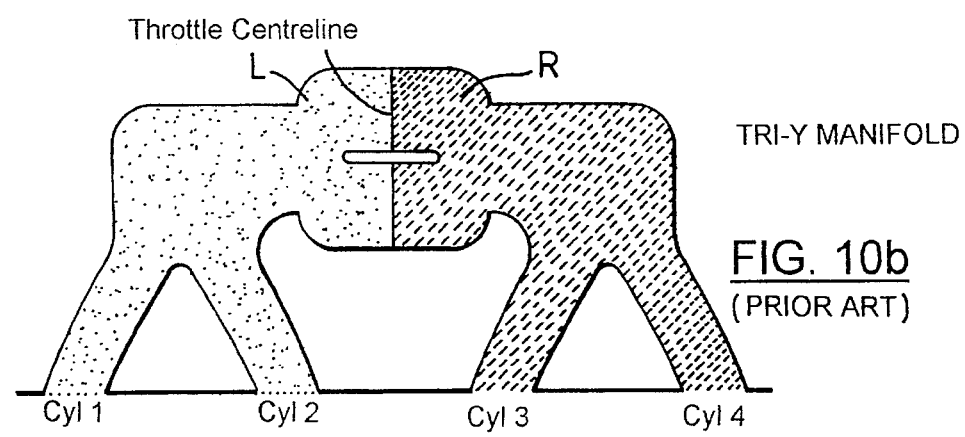
Figure 10C:
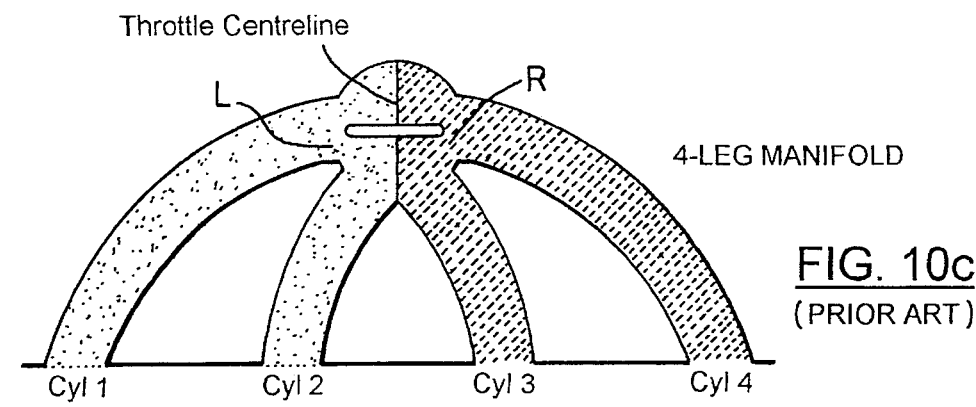

Simplified, 2-D top views of the three manifold designs are provided in FIGS. 10a to 10c. All are shaded to identify left and right halves of the manifolds. These views help illustrate the breathing differences between the manifold types. Notably, conventional manifolds pair cylinders 1–2 and 3–4 together, while the present manifold pairs 1–4 and 3–2 together. The differences in cylinder pairings results in different breathing phasings (i.e. the sequence of gases leaving the plenum) as is summarized in the following table:

|  | Airflow to indicated Cyl No. is drawn from the Plenum's | | |
|---|---|---|---|
| Manifold Type | Left (L) Sector | Right (R) Sector | Resultant Plenum Breathing Order |
| INVENTION | 1,4 | 3,2 | L-R-L-R |
| TRI-Y | 1,2 | 3,4 | L-R-R-L |
| 4-LEG | 1,2 | 3,4 | L-R-R-L |

The plenum breathing characteristics of the three manifold types are graphically portrayed in FIGS. 11a, 11b, 11c, and 11d. They depict the relative location of the mass airflow out of the plenums versus engine position (in number of revolutions). The flow location axes are graduated from Left to Right, with the full scale span representing a 180° change in angular location (the 0°≧180° line defines the throttle plate centerline). While the graphs are based on a simplified model of engine breathing, they indicate the relative sequencing of manifold breathing.

Figure 11A:
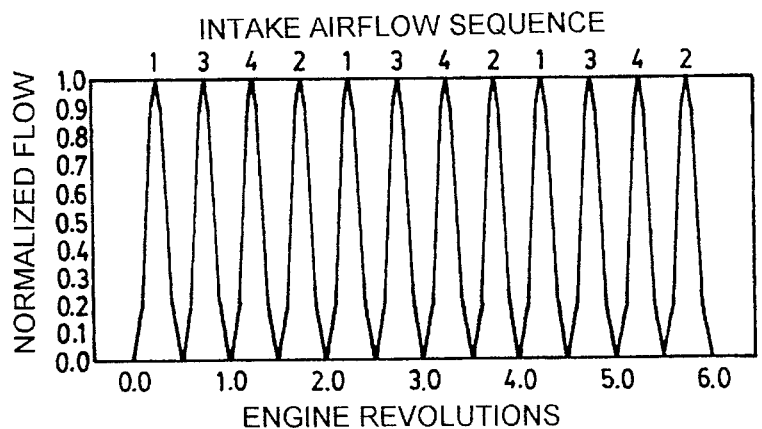
FIGS. 11a to 11d are graphic representations of the different breathing characteristics of the three manifold types.
Figure 11B:
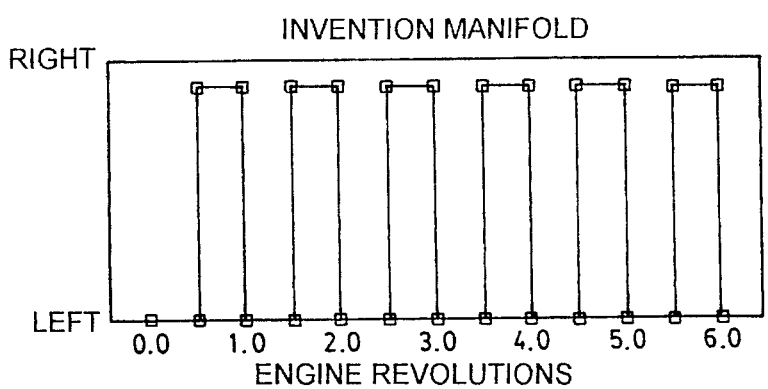
Figure 11C:
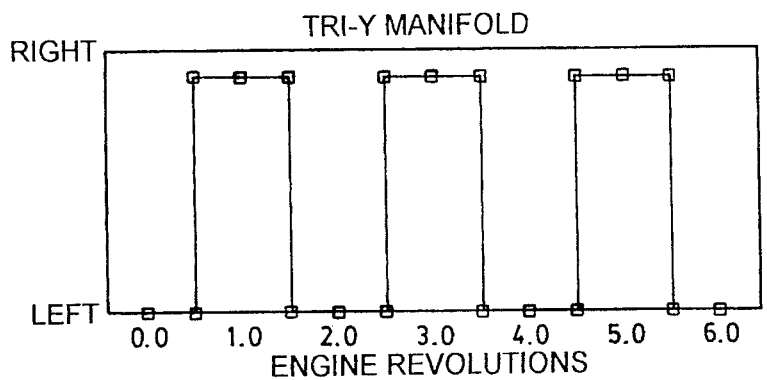
Figure 11D:
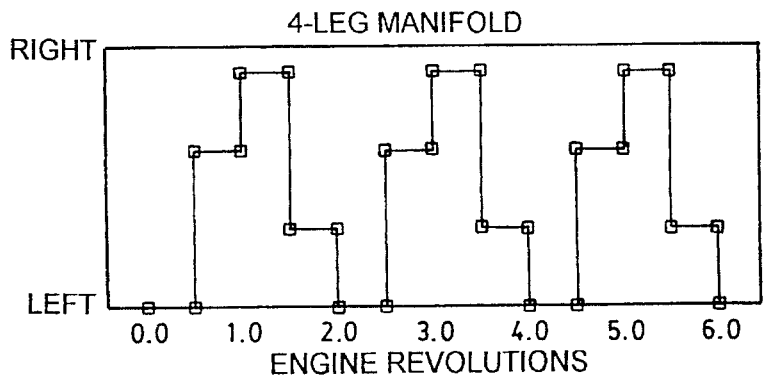

For reference purposes, FIG. 11a shows that four intake pulses occur every two engine revolutions. FIG. 11b illustrates that the present manifold's plenum has a symmetrical breathing sequence which switches sides (L-R-L-R-...) synchronously with the engine's breathing sequence (1-3-4-2). By comparison, the TRI-V manifold's breathing sequence (FIG. 11c) is symmetrical, but switches sides at half the synchronous rate (i.e., every other intake pulse). The 4-LEG manifold's breathing sequence (FIG. 11d), while superficially symmetrical (R-R-L-L-R-R-L-L-...) has flow occurring from four different angular locations and is more accurately labelled as asymmetrical. The symmetrical and synchronous nature of the present manifold breathing sequence is considered to increase stability and tuning efficiency.

Figure 12A:
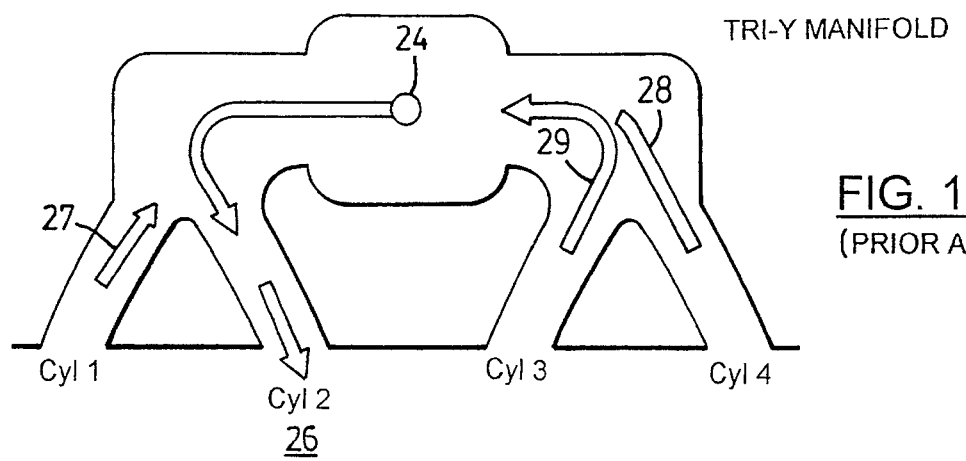
FIGS. 12a, 12b and 12c illustrate the sources of peak fuel flow, comparing the present invention (FIG. 12c) with the prior art (FIGS. 12a and 12b).
Figure 12B:
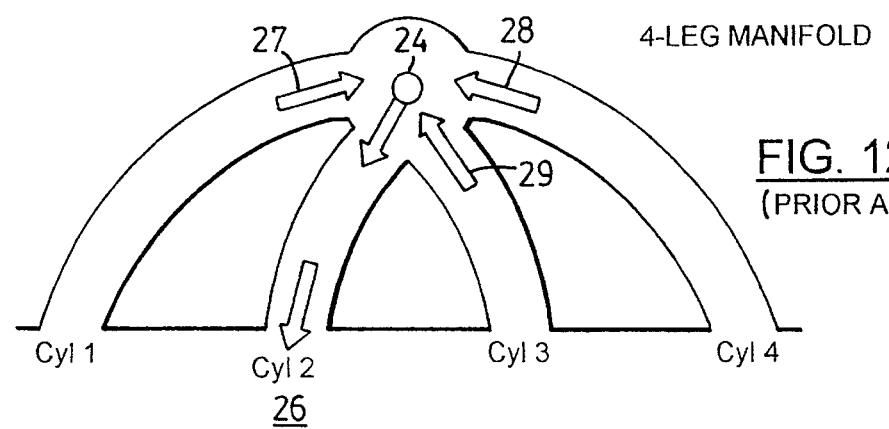
Figure 12C:
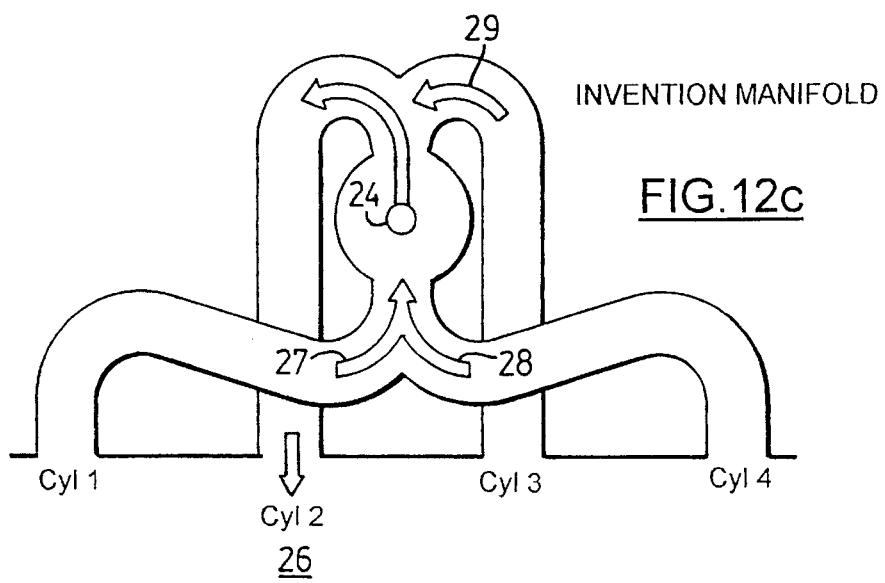

The present design is also regarded as being superior at sourcing a portion of its peak instantaneous flow from the dead-headed runner conduits. The sources of peak flow are illustrated in FIGS. 12a, 12b, and 12c. In the case of TRI-Y manifold (FIG. 12a), dead-headed gases from cylinders 3 and 4 (29,28) combine to reinforce the main air flow past the throttle (24), which is then partially opposed by the gas from deadheaded cylinder 1 (27). In the case of 4-LEG manifold (FIG. 12b), dead-headed gases from cylinders 1 and 1 (27,29) primarily oppose the main air flow past the throttle (24), while the gas from dead-headed cylinder 4 (28) primarily reinforces the main flow (24). In the case of the present design (FIG. 12c), dead-headed gases from cylinder 1 and 4 (27,28) combine to reinforce the main air flow past the throttle (24), which is then marginally reinforced by the gas from deadheaded cylinder 3 (29).

While turbulence is desirable from the standpoint of causing the air and fuel to mix, it is undesirable as it causes flow losses. Accordingly, intake manifolds must balance turbulence and airflow. The present manifold is deemed to offer a lower and particularly stable amount of turbulence which can be adjusted by the geometry of the individual design (e.g., convergence angle of the runner at the branch junctures 17 and 18).

By comparison, the conventional designs tend to have the flow from one or more of the deadheaded runner conduits markedly opposing the flow into the active runner conduit. While this opposition may create turbulence which assists in mixing, it would also act to reduce the manifold's flow efficiency.

While one embodiment of this invention has been illustrated in the accompanying drawings, and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A tuned intake manifold for Otto cycle engines, comprising:

a plenum, an aperture in the plenum through which the plenum can receive a gaseous fuel mixture, first and second branch openings into the plenum, the openings being disposed in substantial opposition to each other across the plenum, first and second branch conduits communicating with said first and second branch openings respectively, each branch conduit divaricating into a plurality of runner conduits all of which terminate at their connections to a head flange; all of the various gaseous paths, each defined by one of the branch conduits and one of the runner conduits into which the branch conduits divaricates, being substantially free of abrupt angulations; and all said paths having substantially the same length beginning at the plenum, substantially the same volume, and substantially the same radius and arc-length of curvature.

2. The tuned intake manifold claimed in claim 1, for use with a four-cylinder engine, wherein each branch conduit divaricates into two runner conduits, the runner conduits for the first branch conduit carrying fuel mixture to cylinders 1 and 4, the runner conduits for the second branch conduit carrying fuel mixture to cylinders 2 and 3.

3. The tuned intake manifold claimed in claim 2, in which the four-cylinders are in line and fire in one of the sequences: 1, 3, 4, 2 or 1, 2, 4, 3, and wherein the head flange connections are in uniformly spaced-apart rectilinear alignment, and in which the plenum is adapted to be located in spaced relation from the head flange and symmetrically with respect to the said connections, with the first branch conduit projecting toward the head flange and the second branch conduit projecting away from the head flange, the runner conduits from said first branch conduit each undergoing an S-curve, the runner conduits from said second branch conduit each undergoing a J-curve.

4. The tuned intake manifold claimed in claim 3, in which heat is applied to the plenum to ensure vaporization of any liquid fuel entering the plenum.

5. The tuned intake manifold claimed in claim 3, in which the plenum is substantially cylindrical, and in which said first and second branch openings are located at opposed ends of a diameter thereof.

6. The tuned intake manifold claimed in claim 2, in combination with a four-cylinder engine which fires in-line cylinders in one of the sequences: 1, 3, 4, 2 or 1, 2, 4, 3.

7. The tuned intake manifold claimed in claim 3, in combination with a four-cylinder engine which fires in-line cylinders in one of the sequences: 1, 3, 4, 2 or 1, 2, 4, 3.

8. The tuned intake manifold claimed in claim 4, in combination with a four-cylinder engine which fires in-line cylinders in one of the sequences: 1, 3, 4, 2 or 1, 2, 4, 3.

9. The tuned intake manifold claimed in claim 5, in combination with a four-cylinder engine which fires in-line cylinders in one of the sequences: 1, 3, 4, 2 or 1, 2, 4, 3.

10. The tuned intake manifold claimed in claim 2, in combination with a vehicle powered by a four-cylinder engine which fires in-line cylinders in one of the sequences: 1, 3, 4, 2 or 1, 2, 4, 3.

11. A method for delivering a gaseous fuel mixture to the cylinders of an engine, having at least four in-line cylinders, the number of cylinders being even, comprising:

receiving the mixture in a plenum through an aperture, passing the mixture out of the plenum through first and second branch openings disposed in substantial opposition to each other across the plenum, passing the mixture into first and second branch conduits communicating with said first and second branch openings respectively, each branch conduit divaricating into a plurality of runner conduits all of which terminate at their connections to the engine; and ensuring that all of the various gaseous paths, each defined by one of the branch conduits and one of the runner conduits into which the branch conduit divaricates, are relatively free of abrupt angulations, and have substantially the same length beginning at the plenum, substantially the same volume, and substantially the same radius and arc-length of curvature.

12. The method claimed in claim 11, wherein each branch conduit divaricates into two runner conduits, the runner conduits for the first branch conduit carrying fuel mixture to cylinders 1 and 4, the runner conduits for the second branch conduit carrying fuel mixture to cylinders 2 and 3.

\* \* \* \* \*